United States Patent [11] 3,529,519

[72] Inventor Robert W. Mitchell
St. Joseph, Michigan
[21] Appl. No. 720,705
[22] Filed April 11, 1968
Continuation-in-part of Ser. No. 529,982, Feb. 21, 1966, pending
[45] Patented Sept. 22, 1970
[73] Assignee Heath Company
Benton Harbor, Michigan
a corporation of Delaware

[54] METHOD AND APPARATUS FOR COLOR ADJUSTING IN PHOTOGRAPHIC PRINTING
15 Claims, 5 Drawing Figs.
[52] U.S. Cl. ................................................. 95/1,
355/32, 355/88, 356/191, 356/195, 96/23
[51] Int. Cl. ................................................. G03b 27/00
[50] Field of Search ................................... 95/1, 10A,
10B; 355/32, 35, 88; 96/23, 25, 45, 2, 1, 16;
356/189, 191, 192, 193, 194

[56] References Cited
UNITED STATES PATENTS
1,125,078 1/1915 Dunn ..................... 356/192
1,597,830 8/1926 Rueger .................... 356/194
2,446,052 7/1948 Loessel et al. ............ 356/194
3,027,801 4/1962 Simmon ................... 355/35
3,285,125 11/1966 Mitchell ................... 95/1

Primary Examiner—Norton Ansher
Assistant Examiner—Richard L. Moses
Attorney—Pendleton, Neuman, Williams and Anderson ABSTRACT: Apparatus and methods for producing optimum color reproduction in color photography. The apparatus includes a color-balancing standard card having a small central aperture through which a limited area of a photographic display may be observed. A background surface of neutral gray is provided for comparison purposes and a plurality of color cast areas which are primarily neutral but have small amounts of particular hues surround the aperture to facilitate the determination of corrective filters or the like. Methods of producing color prints photographically are also described which can utilize the apparatus disclosed and permit accurate and efficient determination of the correct filter media to produce a properly balanced color print.

Patented Sept. 22, 1970
3,529,519
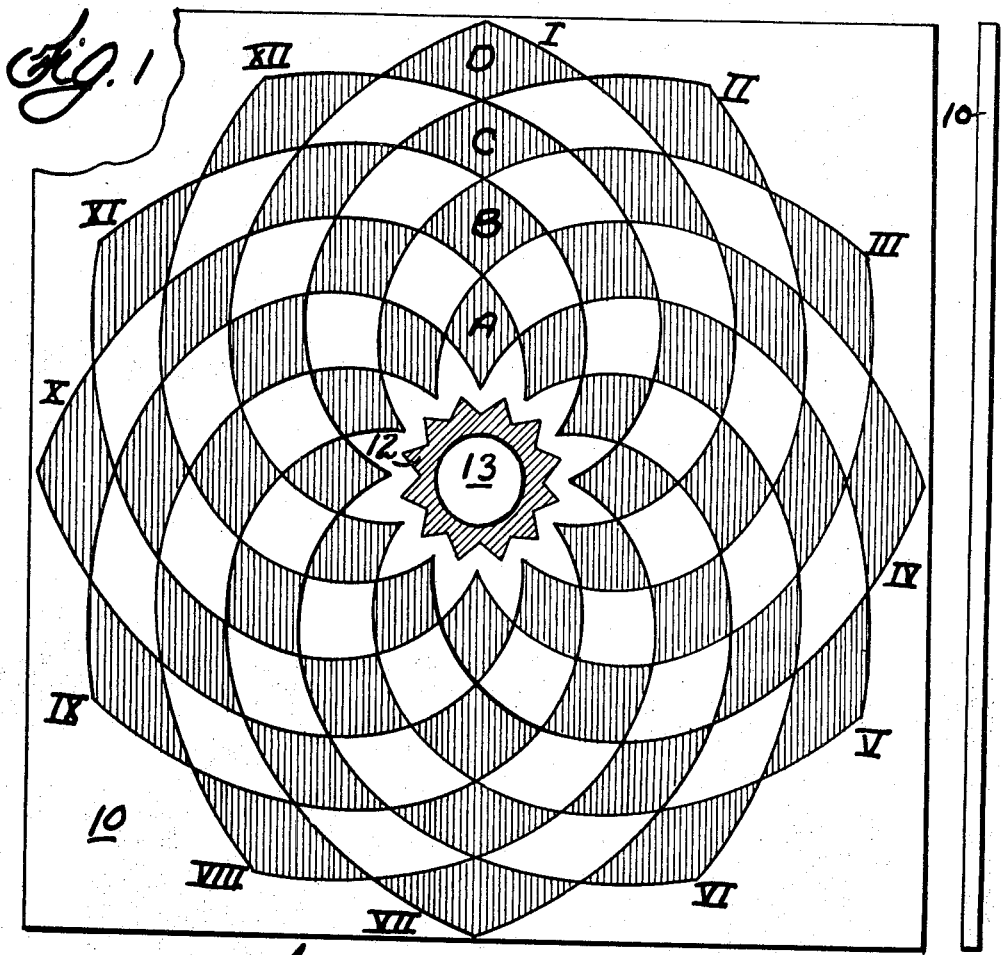
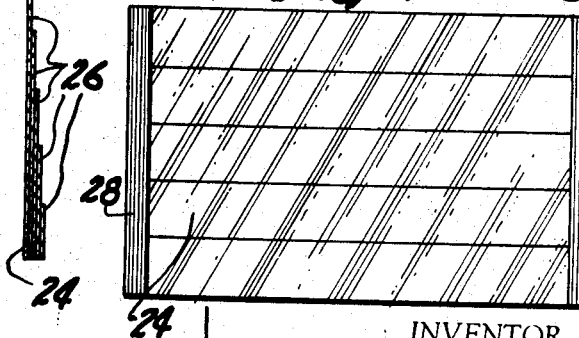
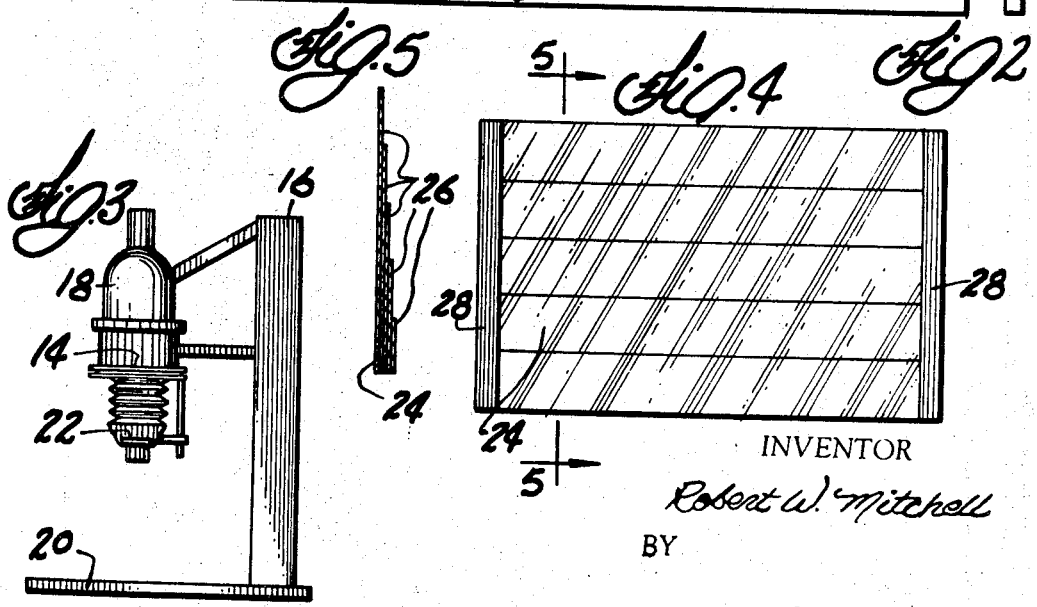
INVENTOR
Robert W. Mitchell
BY
Atty's

METHOD AND APPARATUS FOR COLOR ADJUSTING IN PHOTOGRAPHIC PRINTING

This application is a continuation-in-part of my earlier copending application Ser. No. 529,982, filed Feb. 21, 1966.

BACKGROUND OF THE INVENTION

This invention relates to the photographic printing of color negatives and more particularly to an improved method for adjusting the colors in color prints and to improved apparatus for use in practicing said method.

In an earlier application, application Ser. No. 478,665, filed Aug. 10, 1965 and entitled "Method and Apparatus for Computing Color Balance Characteristics and Preparing Improved Color Prints," an over-all system was described for preparing improved prints which took into account the nature of the printing light source, the film, the printing paper, the developing characteristics, the light under which the original photograph was taken, the compensation of the human eye, and the interrelationship between these variables. As to one of these factors in particular, namely, the compensation for variations in printing papers, further improvement was needed in the method by which the appropriate color and density of correction was determined. It is the principal object of this invention to provide improved methods and apparatus by which this correction can be computed and utilized in the preparation of color prints.

SUMMARY OF THE INVENTION

In the practice of one mode of this invention, a color-balancing chart or standard is prepared which comprises an assembly of neutral density and color-cast areas, the color-casts being close to neutral but departing therefrom by a predetermined increment of hue and color density. The neutral area is located at the center of the color-balancing chart or standard and may also extend over the entire background of the wheel, and an aperture, circular or of any other desired shape, is located centrally in the neutral area. The area of the aperture is approximately equal to an area of one of the surrounding color-cast portions.

The same principle could be applied utilizing a known color, other than neutral, such as a flesh color, with peripheral color casts of that flesh color surrounding the known color, and a hole disposed centrally in the area of said known color.

For convenience, the terminology and numerical designations throughout this specification for color hues or casts and densities are in accordance with accepted nomenclature and common practices in referring to negative photographic films, papers and filters.

In a typical system, the color negative film has three sensitive layers which respond to blue, green and red light, respectively, to produce a negative in the respective complementary colors, yellow, magenta and cyan. For better color rendition, the entire film has an overriding orange mask. The color printing paper has three somewhat similar sensitive layers which respond to blue, green and red rays, respectively. The so-called couplers in each layer develop as yellow, magenta and cyan dyes, and thus accurately restore the original colors which were photographed.

In printing on color paper, filters may be employed to correct for color imbalance in the original scene or in processing and materials. While red, green and blue filters are available, it is generally preferred to utilize magenta, cyan and yellow filters because these absorb a single primary color and thus simplify use. The degree of absorption is specified in density values which vary from 0 to 1.00 for available filter material, and frequently the decimal point is omitted for convenience. For example, a CC100M filter would represent a color compensating magenta filter which has a density of 1.0 and absorbs a major portion of the green light present. Similarly, a CP5Y filter would be a color-printing filter absorbing 5 percent of the blue light that a CP100Y filter would absorb. Filters may be stacked, and the density numbers of light filters add while the primary three absorptive filters do not affect one another when stacked.

In the preferred embodiment of the invention, the color casts displayed vary in the range of .025 to .40 densities with neutral density added thereto to give each area or patch approximately the same intensity, and all patches have approximately the same area as it has been discovered that this greatly facilitates color comparison. A greater range of densities, for example, .025 to .50 may be used, if desired, for greater precision. By utilizing the range up to .50, a single diameter provides a total density range of 1.0 in a given filter material although the radials are listed in the tables in the appropriate complementary color.

The color-balancing standard is utilized in the method of this invention in the following manner. A color negative is prepared which has an area of known color. The negative may be a photograph of a field of neutral gray. However, by photographing a neutral gray card or standard, additional variables are eliminated and precise reproduction of an original, without regard to the nature of the variables, is assured.

The initial print is then prepared from the known negative with some predetermined filter pack applied. This "color bias" may, for example, be CC50Y + CC50M (CC50R or −CC50C). A large step wedge or other graded neutral filter may be employed to give a desired neutral density and the resulting product compared with the color-balance standard. By matching the print with one of the peripheral color-cast areas, substantially complete color correction can be immediately established. Matching is facilitated by the centrally located aperture in the color-balance standard, for in matching, the standard itself may be placed upon the developed print such that an area of intended color on the print may be seen through the aperture and, therefore, readily compared with the peripheral color-cast areas. Thereafter, the color bias and color correction filters can be employed in further printing from the same negative.

DESCRIPTION OF THE DRAWING

For a more complete understanding of the invention, reference will now be made to the accompanying drawing wherein:

FIG. 1 is a plan view of a color-balancing standard constructed in accordance with this invention;

FIG. 2 is a side view thereof;

FIG. 3 is a schematic view of a photographic enlarger;

FIG. 4 is a plan view of a step wedge neutral filter constructed in accordance with this invention; and FIG. 5 is a sectional view of the step wedge of FIG. 4.

THE PREFERRED EMBODIMENT

Referring now to the drawing, the methods of the instant invention will be explained in detail. The color-balance standard 10 is shown in FIGS. 1 and 2 with the surface bearing the color computing indicia being shown in FIG. 1. The standard 10 is preferably rigid or semi-rigid and opaque. The central area 12 is a neutral gray color of any desired size and shape and can extend throughout the background. There is a centrally located aperture 13 therein, approximately equal in area to the surrounding neutral gray, to facilitate color matching. The indicia may be formed photographically or by other processes such as four-color process printing. The particular neutral density should be selected to have a reflection density of approximately 4.0 and all of the peripheral areas should have substantially the same reflective density. This density would correspond very generally to a typical printing cycle with a typical negative on conventional color paper. One standard neutral density often used may be .30.

Surrounding the central hole and neutral area are concentric rings of color-cast areas. The first concentric ring A is composed of 12 equal areas, each having a different hue or color cast but all having substantially the same color density. The approximate color density is 05 so that in the case of a blue cast area, for example, a small amount of the yellow light has been absorbed. The second concentric ring B is similarly composed of 12 areas or patches, each of which has a different hue or cast but all of which have about the same color density, namely, 10. The third concentric ring C has a color density of about 20 and the fourth concentric ring D has a color density of about 40. The standard 10 comprises a central optimum neutral patch surrounded by an orderly arrangement of errors.

These densities have been selected for optimum range and matching accuracy; however, any desired densities may be employed either to increase the range, i.e., greater than 40, or the precision of matching, i.e., less than 05. In the preferred embodiment, neutral density is added to the various patches so that the gross densities will be about the same. It has been found that such a density adjustment greatly facilitates matching and arriving at a proper balance.

While the number of radial groups of patches and the hue or cast of each radial group may be varied somewhat, the disclosed system of 12 radial groups is believed to be optimum. In the disclosed system, group I represents various densities of magenta, group V represents various densities of cyan, and group IX represents various densities of yellow. These three groups are disposed at 120° intervals and equally spaced therebetween are groups of blue (group III), green (group VII) and red (group XI). The even numbered groups represent intermediate colors between the primaries and their complements. While these intermediate colors have no standardized names, they might be described as follows: II, magenta-blue; IV, cyan-blue; VI, cyan-green; VIII, yellow-green; X, yellow-red; XII, magenta-red.

For example, one desirable color wheel employs a central area 12 having a neutral density of .40 and only three concentric rings or axes of color casts surrounding it. The color casts are of densities .10, .30 and .50, respectively, in the 12 hues already listed. By utilizing this combination a particular diameter or diametric axis provides a full density variation of 1.0 in .20 steps from the .50 value of one hue to the .50 value of its complement (or $-.50$ of the one hue).

As already described, a color standard may be projected under white light (3800–4000°K) to produce a test print on a sheet from a new batch of color paper whose characteristics are not precisely known. The test negative is preferably a photograph of a neutral gray field. Other standards and other than white light may be employed provided adequate provisions are taken to avoid misleading results. The test negative is preferably placed in the negative tray 14 of an enlarger 16 as illustrated diagrammatically in FIG. 3. The test negative is projected onto an easel 20 where a piece of sensitive paper is located. Necessary correction for small discrepancies resulting from the color of the light or the color balance in the paper is accomplished by the addition of appropriate filters in the filter tray 22.

In preparing the test print it is preferable to utilize a step wedge such as wedge 24 of FIGS. 4 and 5 to provide optimum density in the print and thus facilitate matching. One desirable wedge may be constructed from five stepped layers 26 of .020" acetate assembled together along the edges by tape 28. Each step provides an effective uniform change in the exposure time of the underlying paper. Thus, an exposure through the wedge 24 provides six effective exposures on a single sheet.

The printed paper is now appropriately developed and dried and the appropriate strip of the print is matched to one of the areas of the standard 10 by placing the standard upon the appropriate strip so that the strip is visible through the center hole 13 and then comparing the area of the strip visible through the hole with the peripheral color-cast areas on the standard. If the strip matches area 12, the original filter pack would have been proper. However, this would rarely be true, and the appropriate strip will normally be matched to one of the peripheral patches.

The color wheel 10 is intended for color correction of actual photographs by a direct comparison; to facilitate such a comparison a loose piece of .10 neutral filter may be utilized and overlaid on either a neutral portion of the photograph or the color wheel. This will enable an approximate match between the print as viewed through aperture 13 and the neutral area 12. By this expedient color or hue matching is facilitated by an initial neutral balance.

The corrective additional filter media can be computed although it is preferred either to print the corrective filter media adjacent each patch or provide an interpretive chart. The corrective filter media for the particular embodiment described are as follows:

TABLE I.—PRINT PACK

| | | A | B | C | D |
|---|---|---|---|---|---|
| I | M | +5M | +10M | +20M | +40M |
| II | MB | +025M−025Y | +5M−5Y | +10M−10Y | +20M−20Y |
| III | B | −5Y | −10Y | −20Y | −40Y |
| IV | CB | −025M−5Y | −5M−10Y | −10M−20Y | −20M−40Y |
| V | C | −5M−5Y | −10M−10Y | −20M−20Y | −40M−40Y |
| VI | CG | −5M−025Y | −10M−5Y | −20M−10Y | −40M−20Y |
| VII | G | −5M | −10M | −20M | −40M |
| VIII | YG | −025M+025Y | −5M+5Y | −10M+10Y | −20M+20Y |
| IX | Y | +5Y | +10Y | +20Y | +40Y |
| X | YR | +025+5Y | +5M+10Y | +10M+20Y | +20M+40Y |
| XI | R | +5M+5Y | +10M+10Y | +20M+20Y | +40M+40Y |
| XII | MR | +5M+025Y | +10M+5Y | +20M+10Y | +40M+20Y |

It will be noted that the color-casts increase in color density along any one of the horizontal axes or rows in the table above at a non-linear or exponential rate. It has been found that this arrangement facilitates color matching and the most accurate ultimate result.

When the color wheel 10 is used with the computing apparatus disclosed in U.S. application Ser. No. 478,665, another convenient table may be employed which provides the scan filter correction directly. That table, in terms of magenta and cyan correction is as follows:

TABLE II.—CALCULATING (COMPLEMENTARY) PACK

| | | A | B | C | D |
|---|---|---|---|---|---|
| I | M | −5M | −10M | −20M | −40M |
| II | MB | −5M−2.5C | −10M−5C | −20M−10C | −40M−20C |
| III | B | −5M−5C | −10M−10C | −20M−20C | −40M−40C |
| IV | CB | −2.5M−5C | −5M−10C | −10M−20C | −20M−40C |
| V | C | −5C | −10C | −20C | −40C |
| VI | CG | +2.5M−2.5C | +5M−5C | +10M−10C | +20M−20C |
| VII | G | +5M | +10M | +20M | +40M |
| VIII | YG | +5M+2.5C | +10M+5C | +20M+10C | +40M+20C |
| IX | Y | +5M+5C | +10M+10C | +20M+20C | +40M+40C |
| X | YR | +2.5M+5C | +5M+10C | +10M+20C | +20M+40C |
| XI | R | +5C | +10C | +20C | +40C |
| XII | MR | −2.5M+2.5C | −5M+5C | −10M+10C | −20M+20C |

The foregoing data could be incorporated as printed matter on an alternate transparent overlay for use in correcting the scan filter pack. The correction is made with magenta and cyan filters only and assumes an initial bias pack including some initial magenta and cyan material.

A third table or printed transparent overlay may also be prepared and used advantageously to permit the introduction of a desired color cast into pictures that have been printed with otherwise proper neutrals. This enables the introduction of a predetermined cast of red for warmth, blue for coolness and the like. Such a table to be associated with FIG. 1 would be as follows:

TABLE III.—COLOR CAST SYNTHESIS

| | | A | B | C | D |
|---|---|---|---|---|---|
| I | M | −5M | −10M | −20M | −40M |
| II | MB | −2.5M+2.5Y | −5M+5Y | −10M+10Y | −20M+20Y |
| III | B | +5Y | +10Y | +20Y | +40Y |
| IV | CB | +2.5M+5Y | +5M+10Y | +10M+20Y | +20M+40Y |
| V | C | +5M+5Y | +10M+10Y | +20M+20Y | +40M+40Y |
| VI | CG | +5M+2.5Y | +10M+5Y | +20M+10Y | +40M+20Y |
| VII | G | +5M | +10M | +20M | +40M |
| VIII | YG | +2.5M−2.5Y | +5M−5Y | +10M−10Y | +20M−20Y |
| IX | Y | −5Y | −10Y | −20Y | −40Y |
| X | YR | −2.5M−5Y | −5M−10Y | −10M−20Y | −20M−40Y |
| XI | R | −5M−5Y | −10M−10Y | −20M−20Y | −40M−40Y |
| XII | MR | −5M−2.5Y | −10M−5Y | −20M−10Y | −40M−20Y |

With the foregoing information at hand, the required filter media may be added to or removed from the filter pack in tray 22 and a properly balanced color print may be made therewith.

It will be apparent that interpolation is possible, both between the radials and between the concentric circles of color-cast areas in each of the three foregoing tables. For example, if the operator determines that the color-cast lies along the magenta radial, but should be between the A and B concentric rings, then the proper filter correction would be +7.5M, a filter which can readily be assembled from available gelatin or film filter material. Similarly, if the operator determines that the intensity of color in a test sample falls on the C ring of the color wheel, but is of a hue intermediate the blue and cyan blue radials a corrective filter can be assembled which would include the −20Y filter correction but only −5M. Any other interpolation which is necessary can be performed by applying the same principles.

While one particular method and apparatus has been described in detail, it will be immediately apparent that the details of the hues and densities of the various filters may be varied as well as the exposures and techniques without departing from the basic concept of utilizing a standard pattern of slightly color-cast grays to compute color correction and immediately obtain balanced color prints.

The colors in the wheel are the actual results of printing each color through an appropriate neutral and/or color filter which is complementary. For example, column IC is the 20 magenta area. It is made by printing adjusted light through a 20 cyan and a 20 yellow filter. For ease of discussion, the usual filter values have arbitrarily been multiplied by a factor of 100 in the charts and discussion above.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims.

I claim:

1. A color standard for observing a color display and for determining the adjustments required for optimum photographic reproduction of said color display, said color standard comprising a substantially planar support member, a central aperture in said planar support member having a size appropriate for observing therethrough a limited portion of said color display, a background on one surface of said planar support member having a predetermined neutral density, a plurality of color cast areas having a size about the same as the size of said aperture in orderly arrangement on said background and surrounding said aperture, said color cast areas being arranged along a plurality of lines extending outwardly from said aperture, all areas lying along one of said lines representing a predetermined hue, the color cast areas along each line having substantially the same total reflective density, the color cast area in each line which is closest to said aperture including a small measurable amount of color representing the hue of that line and the amount of said color in each successive area outwardly from said aperture being greater than the inwardly disposed areas whereby a limited selected portion of said color display can be observed through said aperture and the particular color cast and color density by which said selected portion departs from neutral can be determined.

2. A color standard according to claim 1 wherein said lines comprise a plurality of radials arranged about said aperture and said color cast areas are arranged in a plurality of concentric circles surrounding said aperture.

3. The color standard of claim 2 wherein the color density of each color cast area in a given concentric circle is directly related to the diameter of the circle.

4. The color standard of claim 1 wherein neutral density is added to each color cast area to provide an overall reflective density of said area substantially the same as the reflective density of the remainder of said areas.

5. The color standard of claim 1 wherein said background is substantially neutral with an approximate reflective density of 4.0.

6. The color standard of claim 2 wherein the color density of the color cast areas along each radial increases with the remoteness of the color cast area from the aperture along the radial, the increases being at an exponential rate.

7. The color standard of claim 6 wherein all of the color cast areas thereof are of approximately the same area.

8. The color standard of claim 7 wherein the color cast areas along three radials equally spaced apart at about 120° intervals represent color casts produced by filters of the primary colors, red, blue and green and the color cast areas lying along radials diametrically opposed thereto represent color casts produced by filters of the respective complementary colors, cyan, yellow and magenta.

9. The color standard of claim 8 wherein the peripheral areas along intermediate radials represent color casts produced by filters of combinations of the adjacent primary and complementary colors.

10. The color standard of claim 9 wherein said color cast areas are aligned along a plurality of concentric circles, each circle representing a different density of color error from said optimum photographic reproduction.

11. A method of producing photographic color prints having adjusted colors utilizing photographic equipment to print on sensitive paper whose color characteristics are not precisely known, said method comprising the steps of preparing a color negative having an area of known color characteristic, preparing a color print of said area on said sensitive paper, comparing said color print with a color-adjusting standard including an area of said known color-characteristic and color-cast areas of said known color characteristic, with small amounts of various additional colors, adding filter media with the appropriate small amount of additional color in said photographic equipment to adjust said color print to said known color characteristic and producing a balanced color print on said sensitive paper utilizing said equipment and filter media.

12. The method of claim 11 wherein said color negative is prepared by photographing a sheet of known neutral reflective density.

13. The method of claim 11 wherein said color negative is prepared by photographing a standard sheet including a substantial area having said known color characteristic and developing said negative.

14. The method of claim 11 wherein said comparing of the color print having an area of intended color characteristic with a color-adjusting standard includes placing said color-adjusting standard, having a centrally located hole therein, upon said color print so that the color print is visible through the central hole and then comparing the area of the print visible through the hole with the peripheral color-cast areas on the standard.

15. The method of claim 11 including the initial step of positioning a transparent device having a plurality of areas of different neutral densities in said equipment prior to the preparation of said color print whereby the color density of a portion of said print will correspond to the color density of said known color characteristic and said color-cast areas.

UNITED STATES PATENT OFFICE
CERTIFICATE OF CORRECTION

Patent No. 3,529,519      Dated September 22, 1970

Inventor(s) Robert W. Mitchell

It is certified that error appears in the above-identified patent and that said Letters Patent are hereby corrected as shown below:

Column 4, line 24, Table I, column A - "+025 + 5Y" should read -- +025M + 5Y --.

Signed and sealed this 8th day of June 1971.

(SEAL)
Attest:

EDWARD M. FLETCHER, JR.
Attesting Officer

WILLIAM E. SCHUYLER, JR.
Commissioner of Patents